United States Patent
Wang

(10) Patent No.: US 12,375,592 B2
(45) Date of Patent: Jul. 29, 2025

(54) DISPLAY DEVICE AND MOBILE TERMINAL

(71) Applicants: WUHAN CHINA STAR OPTOELECTRONICS TECHNOLOGY CO., LTD., Wuhan (CN); WUHAN CHINA STAR OPTOELECTRONICS SEMICONDUCTOR DISPLAY TECHNOLOGY CO., LTD., Wuhan (CN)

(72) Inventor: Wenqiang Wang, Wuhan (CN)

(73) Assignees: WUHAN CHINA STAR OPTOELECTRONICS TECHNOLOGY CO., LTD., Wuhan (CN); Wuhan China Star Optoelectronics Semiconductor Display Technology Co., Ltd., Hubei (CN)

( * ) Notice: Subject to any disclaimer, the term of this patent is extended or adjusted under 35 U.S.C. 154(b) by 0 days.

(21) Appl. No.: 17/440,755

(22) PCT Filed: Aug. 6, 2021

(86) PCT No.: PCT/CN2021/111161
§ 371 (c)(1),
(2) Date: Jan. 12, 2023

(87) PCT Pub. No.: WO2023/279464
PCT Pub. Date: Jan. 12, 2023

(65) Prior Publication Data
US 2024/0031462 A1     Jan. 25, 2024

(30) Foreign Application Priority Data
Jul. 7, 2021   (CN) .......................... 202110765786.6

(51) Int. Cl.
*H04M 1/02*     (2006.01)

(52) U.S. Cl.
CPC ....... *H04M 1/0237* (2013.01); *H04M 1/0268* (2013.01)

(58) Field of Classification Search
CPC ............. H04M 1/0237; H04M 1/0268; H04M 1/0295; H04M 1/0233
See application file for complete search history.

(56) References Cited

U.S. PATENT DOCUMENTS

| 11,012,546 B1 | 5/2021 | Song et al. |
| 2012/0055639 A1* | 3/2012 | Maruyama ............. G03B 21/58 160/239 |

(Continued)

FOREIGN PATENT DOCUMENTS

| CN | 1926595 A | 3/2007 |
| CN | 107820399 A | 3/2018 |

(Continued)

OTHER PUBLICATIONS

English translation CN213368329U (Year: 2021).*

(Continued)

*Primary Examiner* — Xanthia C Relford
(74) *Attorney, Agent, or Firm* — PV IP PC; Wei Te Chung

(57) ABSTRACT

Disclosed are a display device and a mobile terminal. The display device comprises a first support frame and a second support frame slidably connected, a flexible screen of which two ends are respectively connected to the first support frame and the second support frame and a linkage assembly of which two ends slidably connected to the first support frame and the second support frame; wherein the first support frame and the second support frame slide relative to each other, so that the flexible screen is furled or unfurled, and the linkage assembly is used to support the first support frame and the second support frame as sliding relatively.

18 Claims, 13 Drawing Sheets

(56) References Cited

U.S. PATENT DOCUMENTS

2019/0230803 A1\* 7/2019 Liao .................. H05K 5/0221
2021/0169242 A1\* 6/2021 Luo ...................... A47G 5/02

FOREIGN PATENT DOCUMENTS

| CN | 107919065 A | | 4/2018 | |
|---|---|---|---|---|
| CN | 109922181 A | | 6/2019 | |
| CN | 110390884 A | | 10/2019 | |
| CN | 111147626 A | | 5/2020 | |
| CN | 111664337 A | | 9/2020 | |
| CN | 112614434 A | | 4/2021 | |
| CN | 112652246 A | | 4/2021 | |
| CN | 112983941 A | | 6/2021 | |
| CN | 213368329 U | \* | 6/2021 | .............. H05K 5/02 |
| KR | 20200111083 A | | 9/2020 | |

OTHER PUBLICATIONS

Chinese Office Action issued in corresponding Chinese Patent Application No. 202110765786.6 dated Mar. 18, 2022, pp. 1-9.
International Search Report in International application No. PCT/CN2021/111161, mailed on Apr. 6, 2022.
Written Opinion of the International Searching Authority in International application No. PCT/CN2021/111161, mailed on Apr. 6, 2022.

\* cited by examiner

__DISPLAY DEVICE AND MOBILE TERMINAL__

RELATED APPLICATIONS

This application is a Notional Phase of PCT Patent Application No. PCT/CN2021/111161 having international filing date of Aug. 6, 2021, which claims the benefit of priority of Chinese Patent Application No. 202110765786.6 filed on Jul. 7, 2021. The contents of the above applications are all incorporated by reference as if fully set forth herein in their entirety.

FIELD OF THE INVENTION

The present invention relates to a display field, and more particularly to a display device and a mobile terminal having the display device.

BACKGROUND OF THE INVENTION

With the development of display technology, users have put forward various needs for display devices. In order to meet different usage requirements, various display devices with different characteristics have also been applied. Among them, consumers are not only pursuing with a simple large screen, but hoped to better meet the requirements of convenience and portability while realizing a large screen.

Organic light-emitting diode (Organic Light-Emitting Diode, OLED) display devices have received widespread attention for their bendability and flexibility. By folding or furling the OLED display device, the space occupied by a larger screen can be reduced to make the display device more portable, thus foldable and rollable display devices are one of the main research directions of OLED display devices.

At present, the structural design of the flexible display device is mainly divided into three types: rolling type, folding type and furling type. Foldable display devices are mainly divided into outward-folding type, inward-folding type and bi-folding type. The defect of the outward-folding display device is mainly manifested in that the screen is exposed to the outside of the whole machine, and the risk of damage by external mechanical friction and wear is high; the bending radius of the inward-folding display device is often designed to be small, and the bending area of the folding screen is usually prone to crease problems, which directly affect the optical effect of the usage; the outward-inward bi-folding display device has a large overall thickness and takes up a lot of space and is poor in portability; The design of the rolling display device is very complicated due to the transmission mechanism of the whole machine and the screen storage structure, and the rollable number of turns that the screen can roll is directly affected by the rolling radius. The smaller the screen rolling radius is, the higher the failure risk of the screen. Correspondingly, the service lifetime is lower, thus it cannot meet the functional requirements of thin and light design. The furling display device can avoid the folding problems of folding mobile phones, and is not affected by the rollable number of screen, and can achieve the advantages of wide-screen and thin and light display design. However, for the furling type display device, if the design of the furling mechanism is unreasonable, it will cause the phenomenon of skewing or jamming in the process of furling or unfurling the flexible screen.

SUMMARY OF THE INVENTION

The embodiment of the present application provides a display device and a mobile terminal. With the driving of the linkage assembly, the first support frame and the second support frame can relatively slide, so that the display part of the flexible screen is increased or decreased, thus the display device can be switched between a large-size display and a small-size display.

The embodiment of the present application provides a display device, comprising:
  a housing, comprising a first support frame and a second support frame that are slidably connected in a first direction;
  a flexible screen, arranged on the housing, and one end is connected to the first support frame, and the other end is connected to the second support frame;
  a linkage assembly, one end of the linkage assembly is slidably connected to the first support frame in a second direction, and an other end is slidably connected to the second support frame in the second direction, and the second direction intersects the first direction;
  wherein the first support frame and the second support frame relatively slide in the first direction, driving one end of the linkage assembly to slide relative to the first support frame along the second direction and driving the other end of the linkage assembly to slide relative to the second support frame along the second direction, so that the display device is switched between a first state and a second state, and an area of the flexible screen on the first support frame and the second support frame in the first state is larger than an area of the flexible screen on the first support frame and the second support frame in the second state, and the linkage assembly is employed to support the first support frame and the second support frame when the display device is in the first state or the second state.

In one embodiment of the present application, the linkage assembly comprises a first linkage member and a second linkage member, and the first linkage member and the second linkage member are rotatably connected, and the first linkage member comprises a first end and a second end opposed to each other, and the second linkage member comprises a third end and a fourth end opposed to each other, and the first end and the third end are slidably connected to the first support frame in the second direction, and the second end and the fourth end are slidably connected to the second support frame in the second direction.

In one embodiment of the present application, a side of the first support frame away from the second support frame is provided with a first sliding groove and a third sliding groove parallel to the second direction and spaced apart, and a side of the second support frame away from the first support frame is provided with a second sliding groove and a fourth sliding groove parallel to the second direction and spaced apart;
  wherein the first end is slidably connected to the first sliding groove, the second end is slidably connected to the second sliding groove, the third end is slidably connected to the third sliding groove, and the fourth end is slidably connected to the fourth sliding groove.

In one embodiment of the present application, a distance from the first end to a rotating joint of the first linkage member and the second linkage member, a distance from the second end to the rotating joint of the first linkage member and the second linkage member, a distance from the third end to the rotating joint of the first linkage member and the second linkage member and a distance from the fourth end to the rotating joint of the first linkage member and the second linkage member are all equal.

In one embodiment of the present application, a rotating shaft is provided to the first linkage member where is connected to the second linkage member, and a rotating hole is provided to the second linkage member where is connected to the first linkage member for accommodating the rotating shaft.

In one embodiment of the present application, a side of the first support frame close to the second support frame is provided with a plurality of first support plates, and a side of the second support frame close to the first support frame is provided with a plurality of second support plates, and the plurality of first support plates and the plurality of second support plates are slidably connected in the first direction.

In one embodiment of the present application, the plurality of first support plates and the plurality of second support plates are arranged alternately, and a lateral side of the first support plate connected to the second support plate is provided with a slideway, and a lateral side of the second support plate connected to the first support plate is provided with a sliding block, and the sliding block is slidably connected to the slideway.

In one embodiment of the present application, a first lock is provided on the first support frame, and a second lock cooperating with the first lock is provided on the second support frame, the first lock is remote from the second lock in the first state, and the first lock and the second lock are detachably connected in the second state.

In one embodiment of the present application, the first lock comprises a plug pin, and the second lock comprises a socket matched with the plug pin.

According to the above objective of the present application, provided is a mobile terminal, comprising a display device and a terminal body, the terminal body and the display device combined into one body, and the display device comprises:
  a housing, comprising a first support frame and a second support frame that are slidably connected in a first direction;
  a flexible screen, arranged on the housing, and one end is connected to the first support frame, and the other end is connected to the second support frame;
  a linkage assembly, one end of the linkage assembly is slidably connected to the first support frame in a second direction, and an other end is slidably connected to the second support frame in the second direction, and the second direction intersects the first direction;
  wherein the first support frame and the second support frame relatively slide in the first direction, driving one end of the linkage assembly to slide relative to the first support frame along the second direction and driving the other end of the linkage assembly to slide relative to the second support frame along the second direction, so that the display device is switched between a first state and a second state, and an area of the flexible screen on the first support frame and the second support frame in the first state is larger than an area of the flexible screen on the first support frame and the second support frame in the second state, and the linkage assembly is employed to support the first support frame and the second support frame when the display device is in the first state or the second state.

In one embodiment of the present application, the linkage assembly comprises a first linkage member and a second linkage member, and the first linkage member and the second linkage member are rotatably connected, and the first linkage member comprises a first end and a second end opposed to each other, and the second linkage member comprises a third end and a fourth end opposed to each other, and the first end and the third end are slidably connected to the first support frame in the second direction, and the second end and the fourth end are slidably connected to the second support frame in the second direction.

In one embodiment of the present application, a side of the first support frame away from the second support frame is provided with a first sliding groove and a third sliding groove parallel to the second direction and spaced apart, and a side of the second support frame away from the first support frame is provided with a second sliding groove and a fourth sliding groove parallel to the second direction and spaced apart;
  wherein the first end is slidably connected to the first sliding groove, the second end is slidably connected to the second sliding groove, the third end is slidably connected to the third sliding groove, and the fourth end is slidably connected to the fourth sliding groove.

In one embodiment of the present application, a distance from the first end to a rotating joint of the first linkage member and the second linkage member, a distance from the second end to the rotating joint of the first linkage member and the second linkage member, a distance from the third end to the rotating joint of the first linkage member and the second linkage member and a distance from the fourth end to the rotating joint of the first linkage member and the second linkage member are all equal.

In one embodiment of the present application, a rotating shaft is provided to the first linkage member where is connected to the second linkage member, and a rotating hole is provided to the second linkage member where is connected to the first linkage member for accommodating the rotating shaft.

In one embodiment of the present application, a side of the first support frame close to the second support frame is provided with a plurality of first support plates, and a side of the second support frame close to the first support frame is provided with a plurality of second support plates, and the plurality of first support plates and the plurality of second support plates are slidably connected in the first direction.

In one embodiment of the present application, the plurality of first support plates and the plurality of second support plates are arranged alternately, and a lateral side of the first support plate connected to the second support plate is provided with a slideway, and a lateral side of the second support plate connected to the first support plate is provided with a sliding block, and the sliding block is slidably connected to the slideway.

In one embodiment of the present application, a first lock is provided on the first support frame, and a second lock cooperating with the first lock is provided on the second support frame, the first lock is remote from the second lock in the first state, and the first lock and the second lock are detachably connected in the second state.

In one embodiment of the present application, the first lock comprises a plug pin, and the second lock comprises a socket matched with the plug pin.

Compared with the prior art, the present application adopts a linkage assembly that can slide synchronously with respect to the first support frame and the second support frame. When the first support frame and the second support frame slide relatively, the linkage assembly is driven to slide relative to the first support frame and the second support frame, so that the area of the flexible screen unfurled on the first support frame and the second support frame is increased or decreased. Meanwhile, the linkage assembly can support the first support frame and the second support frame during the relative sliding process of the first support frame and the second support frame, so that the first support frame and the second support frame can maintain stable relative sliding, thus the display device can be switched between a large-size display and a small-size display.

BRIEF DESCRIPTION OF THE DRAWINGS

The technical solution and the beneficial effects of the present application are best understood from the following detailed description with reference to the accompanying figures and embodiments.

DETAILED DESCRIPTION OF PREFERRED EMBODIMENTS

Figure 1:
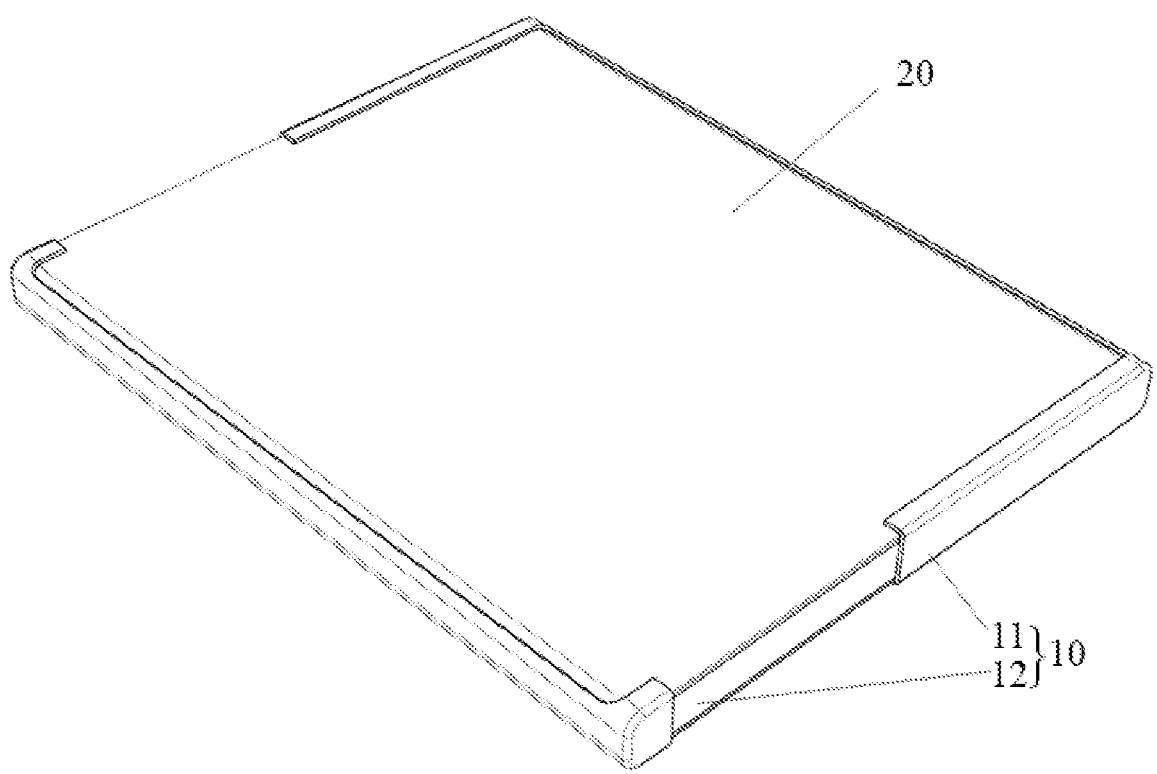
FIG. 1 is a schematic structural diagram of a display device in a first state according to an embodiment of the application.
Figure 2:
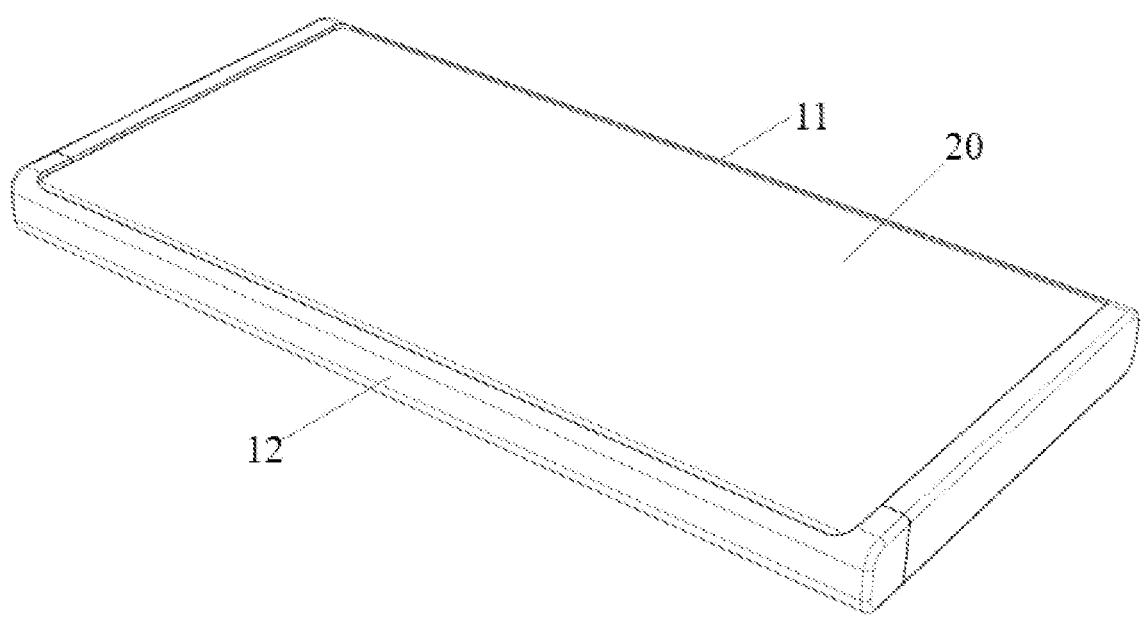
FIG. 2 is a schematic structural diagram of a display device in a second state according to an embodiment of the application.
Figure 3:
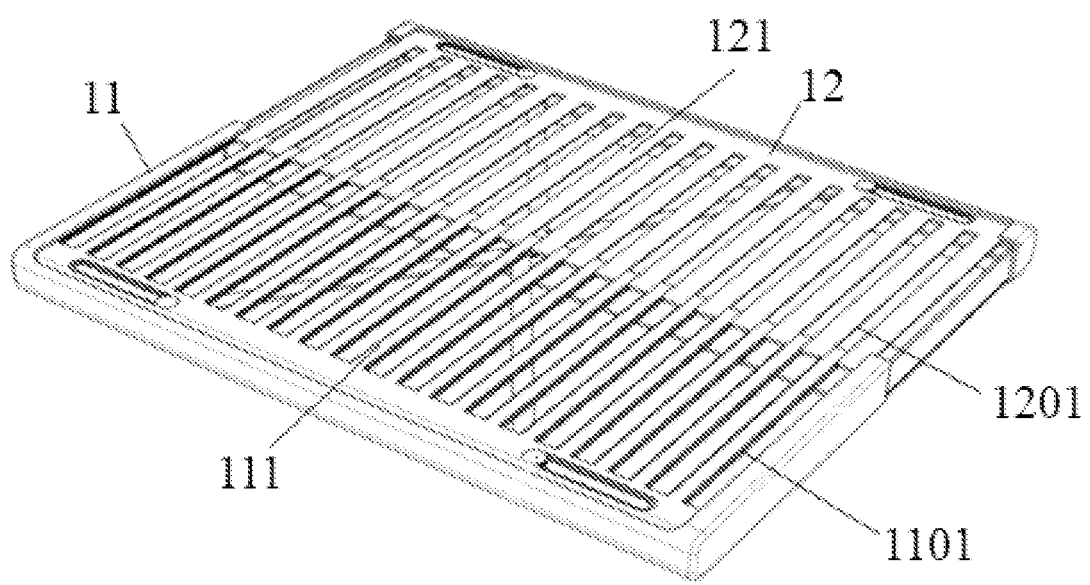
FIG. 3 is a front view diagram of the internal structure of the display device in the first state according to an embodiment of the application.
Figure 4:
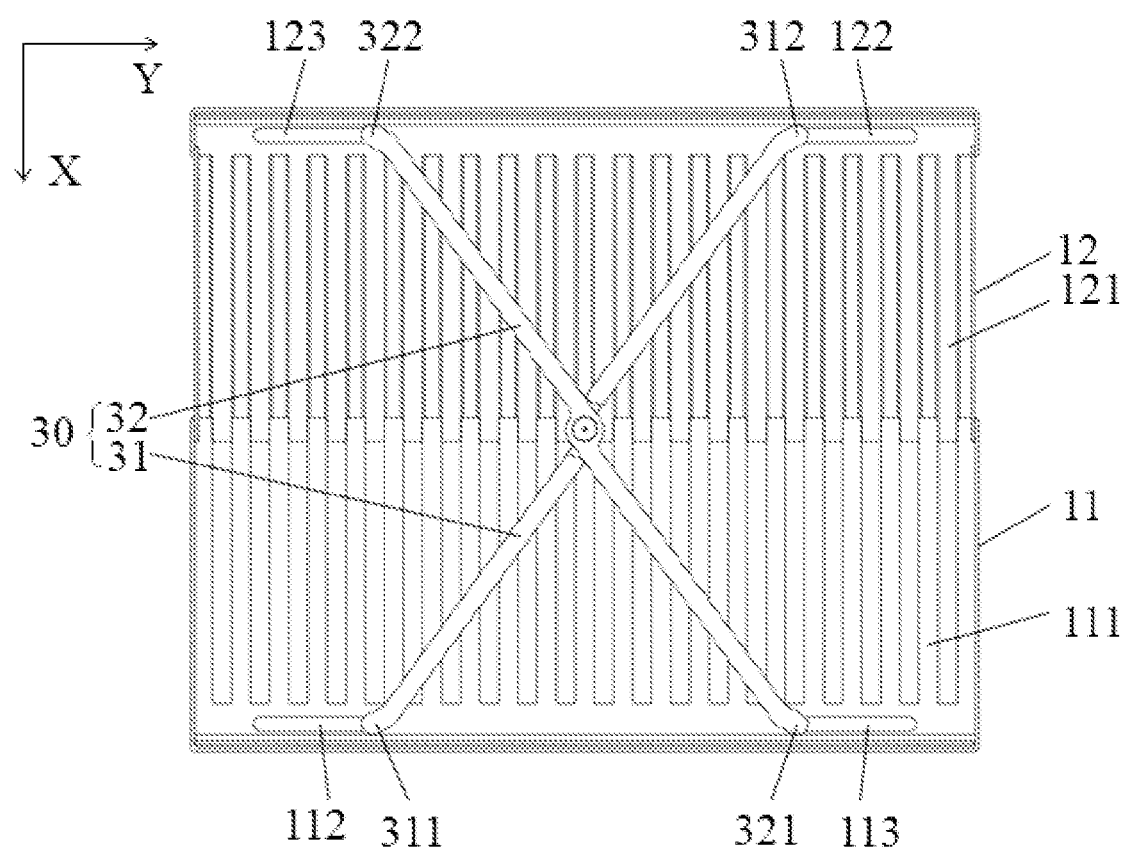
FIG. 4 is a rear view diagram of the internal structure of the display device in the first state according to an embodiment of the application.

For better explaining the technical solution and the effect of the present invention, the present invention will be further described in detail with the accompanying drawings in the specific embodiments. It is clear that the described embodiments are merely part of embodiments of the present application, but not all embodiments. Based on the embodiments of the present application, all other embodiments to those of skilled in the premise of no creative efforts obtained, should be considered within the scope of protection of the present application.

The following disclosure provides many different embodiments or illustrations for implementing different structures of the present application. In order to simplify the disclosure of the present application, the components and arrangements of the specific illustrations are described below. Certainly, they are merely illustrations and are not intended to limit the present application. In addition, the present application may be repeated with reference to the numerals and/or reference numerals in the various embodiments, which are for the purpose of simplicity and clarity, and do not indicate the relationship between the various embodiments and/or arrangements discussed. Moreover, the present application provides illustrations of various specific processes and materials, but one of ordinary skill in the art will recognize the use of other processes and/or the use of other materials.

The embodiment of the present application provides a display device. With reference to FIGS. 1, 2, 3 and 4, the display device comprises a housing 10, a flexible screen 20 and a linkage assembly 30.

The housing 10 comprises a first support frame 11 and a second support frame 12 slidably connected in a first direction X; the flexible screen 20 is arranged on the housing 10, and one end of the flexible screen 20 is connected to the first support frame 11, and the other end of the flexible screen 20 is connected to the second support frame 12; one end of the linkage assembly 30 is slidably connected to the first support frame 11 in a second direction Y, and the other end of the linkage assembly 30 is slidably connected to the second support frame 12 in the second direction Y, and the second direction X intersects the first direction Y.

The first support frame 11 and the second support frame 12 relatively slide in the first direction X, driving one end of the linkage assembly 30 to slide relative to the first support frame 11 along the second direction Y and driving the other end of the linkage assembly 30 to slide relative to the second support frame 12 along the second direction Y, so that the display device is switched between a first state and a second state, and an area of the flexible screen 20 on the first support frame 11 and the second support frame 12 in the first state is larger than an area of the flexible screen 20 on the first support frame 11 and the second support frame 12 in the second state, and the linkage assembly 30 is employed to support the first support frame 11 and the second support frame 12 when the display device is in the first state or the second state.

In the implementation and application process, the embodiment of the present application provides the first support frame 11 and the second support frame 12 that are relatively slidable along the first direction X, and meanwhile, provides the linkage assembly 30 that is slidable along the direction Y relative to the second support frame 11 and the second support frame 12. Then, as the first support frame 11 and the second support frame 12 relatively slide along the first direction X, the linkage assembly 30 slides along the direction Y relative to the second support frame 11 and the second support frame 12, and supports the second support frame 11 and the second support frame 12 when the display device is in the first state or the second state to improve the stability of the first support frame 11 and the second support frame 12 during relative sliding and to maintain the relative positions of the first support frame 11 and the second support frame 12, thus the display device can be switched between a large-size display and a small-size display.

Specifically, referring to FIGS. 1 to 10, the display device comprises a housing 10, a flexible screen 20 arranged on the housing 10 and a linkage assembly 30 arranged inside the housing 10.

The housing 10 comprises a first support frame 11 and a second support frame 12 that are slidably connected, and the first support frame 11 and the second support frame 12 can slide relative to each other along the first direction X.

A side of the first support frame 11 close to the second support frame 12 is provided with a plurality of first support plates 111, and a side of the second support frame 12 close to the first support frame 11 is provided with a plurality of second support plates 121, and the plurality of first support plates 111 and the plurality of second support plates 121 are slidably connected, so that the first support plates 111 and the second support plates 121 can relatively slide to each other in the first direction X.

Furthermore, the plurality of first support plates 111 and the plurality of second support plates 121 are disposed alternately, and a lateral side of the first support plate 111 connected to the second support plate 121 is provided with a slideway 1101, and a lateral side of the second support plate 121 connected to the first support plate 111 is provided with a sliding block 1201, and the sliding block 1201 is slidably connected to the slideway 1101.

Figure 10:
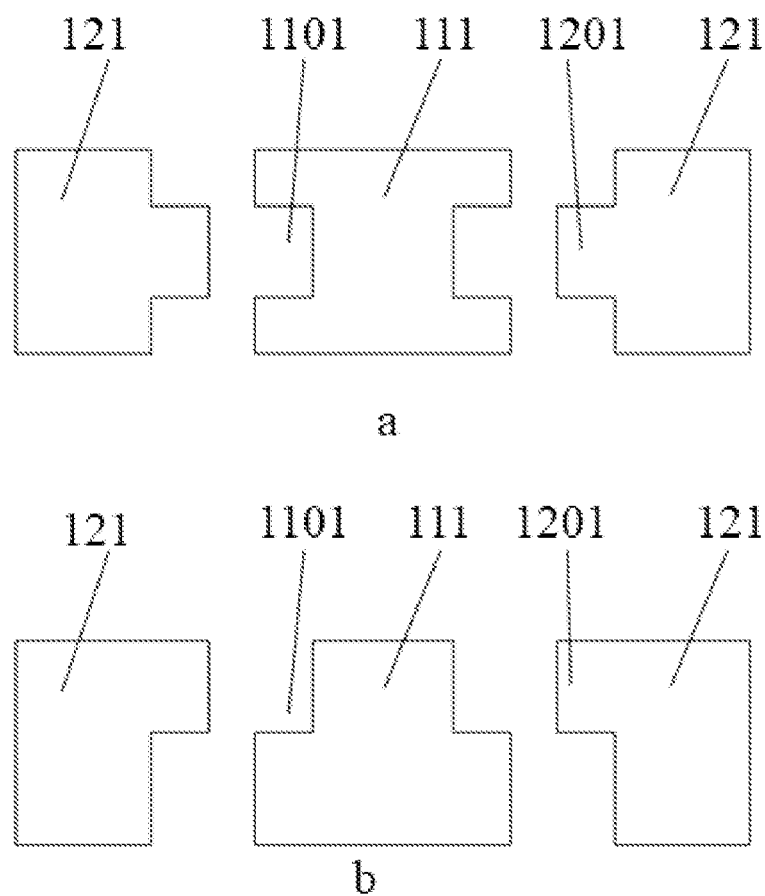
FIG. 10 is a connection structural diagram of a first support plate and second support plates in the display device provided by an embodiment of the application.

Specifically, as shown in FIG. 10, in an embodiment of the present application, as shown in the structure a in FIG. 10, the slideway 1101 is arranged in the middle of the lateral side of the first supporting plate 111 close to the second supporting plate 121, and the sliding block 1201 is arranged in the middle of the lateral side of the second supporting plate 121 close to the first supporting plate 111 and slidably connected with the slideway 1101. The length of the slideway 1101 is equal to the length of the sliding block 1201, the length of the slideway 1101 is also equal to the length of the first support plate 111, and the length of the sliding block 1201 is also equal to the length of the second support plate 121. Thus, he mutual support between the first support plate 111 and the second support plate 121 during the sliding process can be greater, so as to improve the stability of the first support plate 111 and the second support plate 121 during the relative sliding process.

In another embodiment of the present application, as shown in the structure b in FIG. 10, the slideway 1101 is arranged in the upper part of the lateral side of the first supporting plate 111 close to the second supporting plate 121, and the sliding block 1201 is arranged in the upper part of the lateral side of the second supporting plate 121 close to the first supporting plate 111 and slidably connected with the slideway 1101. The length of the slideway 1101 is equal to the length of the sliding block 1201, the length of the slideway 1101 is also equal to the length of the first support plate 111, and the length of the sliding block 1201 is also equal to the length of the second support plate 121. Thus, he mutual support between the first support plate 111 and the second support plate 121 during the sliding process can be greater, so as to improve the stability of the first support plate 111 and the second support plate 121 during the relative sliding process.

Besides, the slideway 1101 and the sliding block 1201 can also be respectively arranged at any position in the lower parts or the lateral sides of the first support plate 111 and the second support plate 121. However, it is necessary to satisfy that the slideway 1101 and the sliding block 1201 can be connected in a slidable manner, and the plurality of first support plates 111 and the plurality of second support plates 121 are arranged coplanarly toward the side of the display surface of the display device, so as to provide better support to the flexible screen 20.

Specifically, during the relative sliding process of the plurality of first support plates 111 and the plurality of second support plates 121 in the first direction X, when the plurality of first support plates 111 and the plurality of second support plates 121 move away from each other, the furled area of the first support plate 111 and the second support plate 121 becomes larger, and the display device can be switched to the first state, and when the plurality of first support plates 111 and the plurality of second support plates 121 move close to each other, the furled area of the first support plate 111 and the second support plate 121 becomes smaller, and the display device can be switched to the second state.

Figure 5:
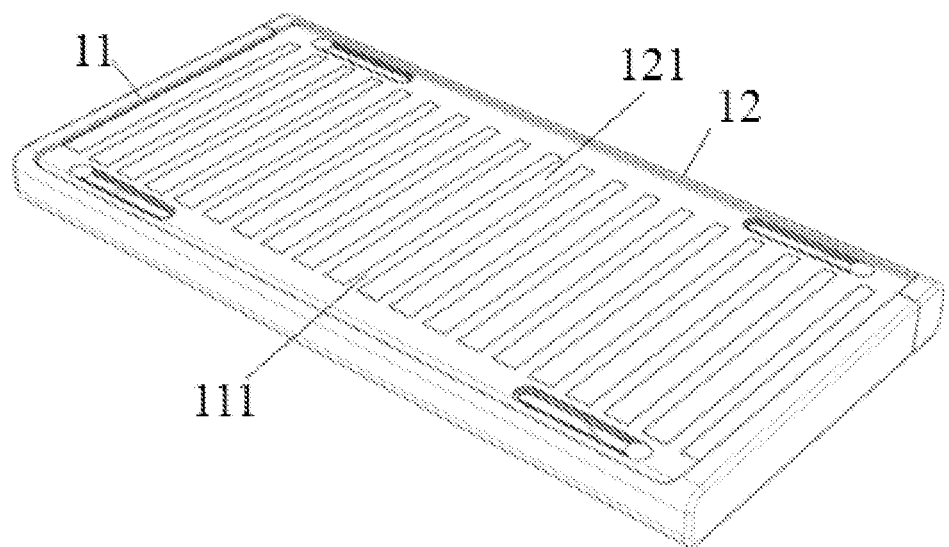
FIG. 5 is a front view diagram of the internal structure of the display device in the second state according to an embodiment of the application.
Figure 6:
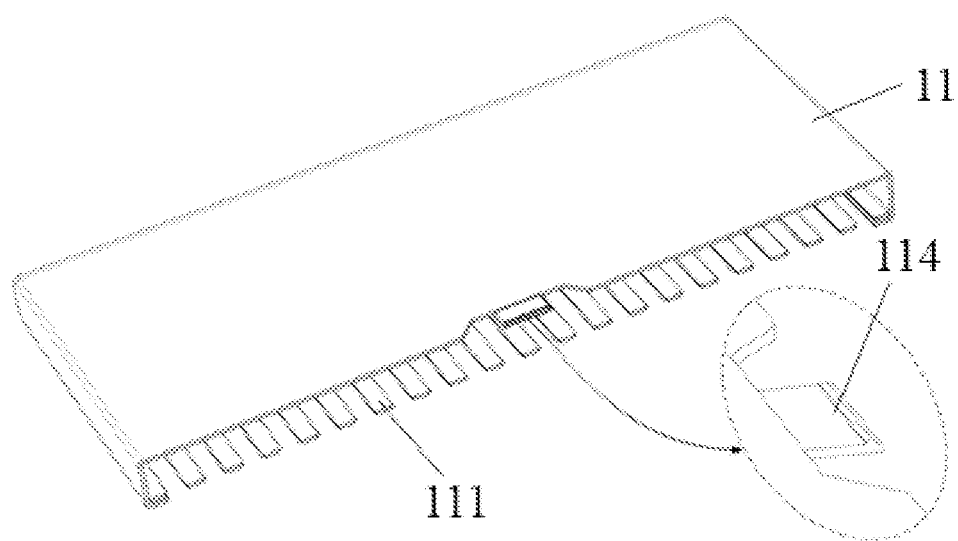
FIG. 6 is a rear view diagram of the first support frame in the display device provided by an embodiment of the application.
Figure 7:
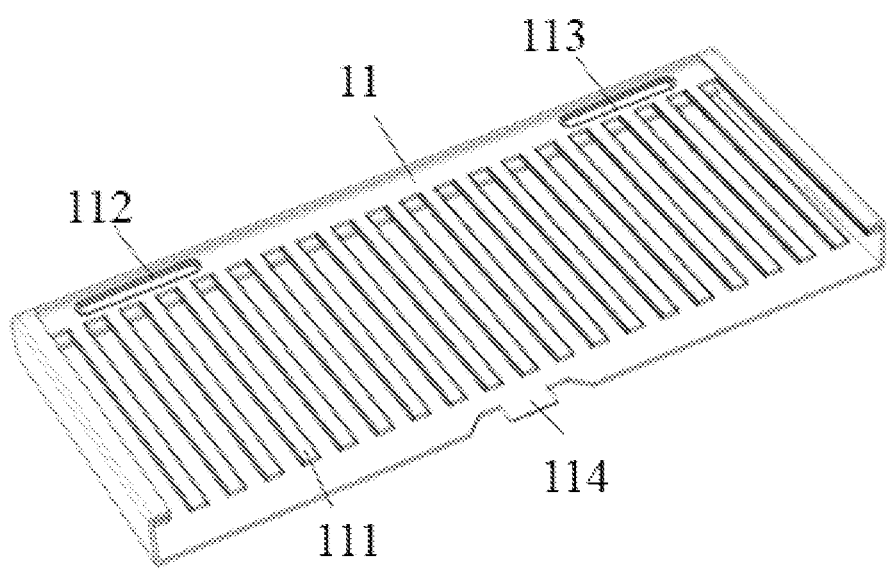
FIG. 7 is a front view diagram of the first support frame in the display device provided by an embodiment of the application.
Figure 8:
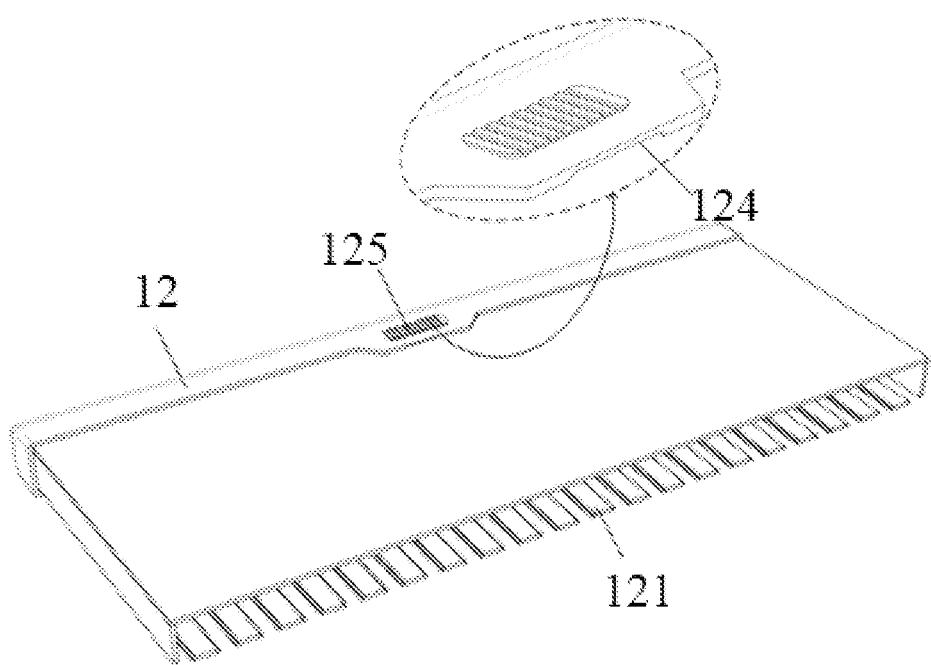
FIG. 8 is a rear view diagram of the second support frame in the display device provided by an embodiment of the application.
Figure 9:
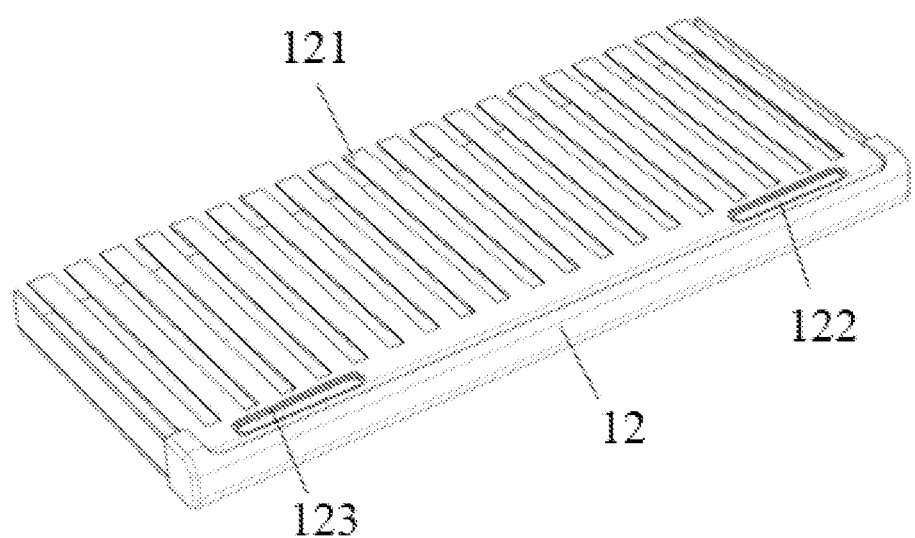
FIG. 9 is a front view diagram of the second support frame in the display device provided by an embodiment of the application.

In the embodiment of the present application, when the display device is in the second state, as shown in FIG. 5, the first support plate 111 will abut the second support frame 12, and the second support plate 121 will abut the first support frame 11. The first support plate 111 is provided with a first concave part which abut the second support frame 12, and the second support frame 12 is provided with a first convex part cooperating with the first concave part which abut the first support plate 111, so that the abutment between the first support plate 111 and the second support frame 12 may form a convex-concave interlocking structure to improve stability. Specifically, the positions of the first convex part and the first concave part can be exchanged. Namely, the first convex part is provided on the first support plate 111, and the first concave part is provided on the second support frame 12. It is not limited here.

Similarly, the second support plate 121 is provided with a second convex part which abut the first support frame 11, and the first support frame 11 is provided with a second concave part cooperating with the second convex part which abut the second support plate 121, so that the abutment between the second support plate 121 and the first support frame 11 may form a convex-concave interlocking structure to improve stability. Specifically, the positions of the second convex part and the second concave part can be exchanged. Namely, the second concave part is provided on the second support plate 121, and the second convex part is provided on the first support frame 11. It is not limited here.

In the embodiment of the present application, the flexible screen 20 is arranged on the housing 10, and one end of the flexible screen 20 is connected to the first support frame 11, and the other end is connected to the second support frame 12, such that the flexible screen 20 is unfurled on the first support frame 11 and the second support frame 12 for implementing the display function.

Specifically, part of the flexible screen 20 is unfurled on the first support frame 11 and the second support frame 12, and the other part of the flexible screen 20 can be stored in the housing 10 in a rolling or sliding manner. When the display device is switched to the first state, part of the flexible screen 20 stored in the housing 10 is stretched out and unfurled on the first support frame 11 and the second support frame 12 for display, so that the area of the flexible screen 20 for displaying increases; when the display device is switched to the second state, part of the flexible screen 20 unfurled on the first support frame 11 and the second support frame 12 is stored into the housing 10, so that the area of the flexible screen 20 for displaying decreases to accomplish the switching of the display device between the large-size display and the small-size display.

Further, in the embodiment of the present application, please refer to FIG. 6, FIG. 7, FIG. 8 and FIG. 9, the first support frame 11 further comprises a first rear shell disposed on a side of the plurality of first support plates 111 away from the flexible screen 20 unfurled on the first support frame 11 and the second support frame 12. The second support frame 12 further comprises a second rear shell disposed on a side of the plurality of second support plates 121 away from the flexible screen 20 unfurled on the first support frame 11 and the second support frame 12. A first lock 114 is provided on the first support frame 11, and the first lock 114 is arranged on a side of the first rear shell close to the second support frame 12. A second lock 124 cooperating with the first lock 114 is provided on the second support frame 12, and the second lock 124 is arranged on a side of the second rear shell away from the first support frame 11. The first lock 114 is remote from the second lock 124 in the first state, and the first lock 114 and the second lock 124 are detachably connected in the second state.

Optionally, the first lock 114 comprises a plug pin, and the second lock 124 comprises a socket matched with the plug pin. Furthermore, the second support frame 12 is further provided with a button 125 connected to the socket. When the plug is inserted into the socket in a locked state, the button 125 can be pressed to make the plug and the socket detachable. When the display device is in the second state, the plug is inserted into the socket to make a fixed connection between the first support frame 11 and the second support frame 12 to prevent accidental sliding between the first support frame 11 and the second support frame 12 due to external forces; when the display device needs to be switched from the second state to the first state, the button 125 can be pressed to separate the plug from the socket, so that the first support frame 11 and the second support frame 12 slide in the first direction X to achieve the large-size display.

In the embodiment of the present application, the display device further comprises a linkage assembly 30, and the linkage assembly 30 comprises a first linkage member 31 and a second linkage member 32, and the first linkage member 31 and the second linkage member 32 are rotatably connected.

The first linkage member 31 comprises a first end 311 and a second end 312 opposed to each other, and the second linkage member 32 comprises a third end 321 and a fourth end 322 opposed to each other, and the first end 311 and the third end 321 are slidably connected to the first support frame 11 in the second direction Y, and the second end 312 and the fourth end 322 are slidably connected to the second support frame 12 in the second direction Y, and the second direction Y intersects the first direction X. In the embodiment of the present application, the second direction Y is perpendicular to the first direction X.

Furthermore, a side of the first support frame 11 away from the second support frame 12 is provided with a first sliding groove 112 and a third sliding groove 113 parallel to the second direction Y and spaced apart, and a side of the second support frame 12 away from the first support frame 11 is provided with a second sliding groove 122 and a fourth sliding groove 123 parallel to the second direction Y and spaced apart, wherein the first end 311 is provided with a sliding block and slidably connected to the first sliding groove 112, the second end 312 is provided with a sliding block and slidably connected to the second sliding groove 122, and the third end 321 is provided with a sliding block and slidably connected to the third sliding groove 113, and the fourth end 322 is provided with a sliding block and slidably connected to the fourth sliding groove 123.

In the embodiment of the present application, the first sliding groove 112 and the fourth sliding groove 123 are located on one side of the display device, and the second sliding groove 122 and the third sliding groove 113 are located on the opposite side of the display device, so that the first linkage 31 member and the second linkage member 32 intersect. The first linkage member 31 and the second linkage member 32 are rotationally connected at the intersection, so that when the two ends of the first linkage member 31 slide in the second direction Y and the two ends of the second linkage member 32 slide in the second direction Y, the first linkage member 31 and the second linkage member 32 rotate in opposite directions, thereby the distance between the first end 311 and the fourth end 322 and the distance between the second end 312 and the third end 321 increase or decrease.

As aforementioned, when the first support frame 11 and the second support frame 12 slide away from each other in the first direction X, the first end 311 and the third end 321 will be driven to slide closer to each other in the second direction Y, and the second end 312 and the fourth end 322 will be driven to slide closer to each other in the second direction Y, and the first linkage member 31 and the second linkage member 32 will rotate in opposite directions. Specifically, the first linkage member 31 rotates counterclockwise, and the second linkage member 32 rotates clockwise, so that the distance between the first end 311 and the fourth end 322 and the distance between the second end 312 and the third end 321 increase as the first support frame 11 and the second support frame 12 slide away from each other in the first direction X. In the embodiment of the present application, the first linkage member 31 and the second linkage member 32 are in a cross-rotating connection and are connected to both sides of the display device at the same time, and slide along with the sliding between the first support frame 11 and the second support frame 12, then to stably support during the sliding process of the first support frame 11 and the second support frame 12 and to maintain the relative positions of the first support frame 11 and the second support frame 12, thus the display device can be switched between a large-size display and a small-size display.

Figure 11:
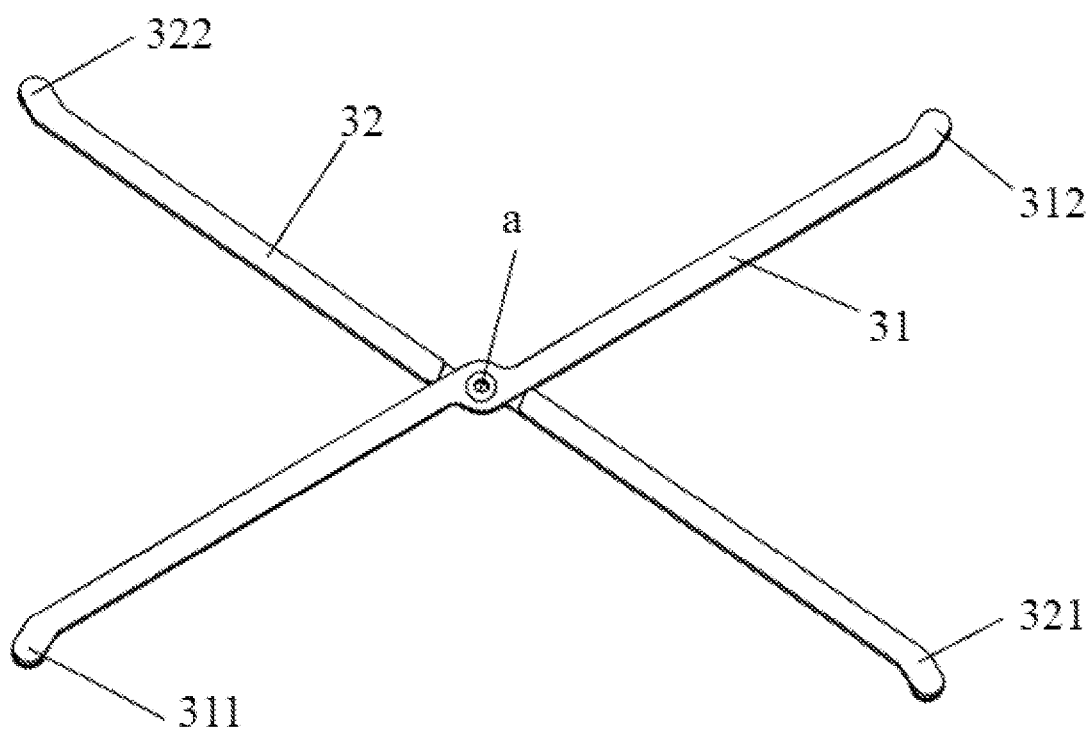
FIG. 11 is a connection structural diagram of a first linkage member and a second linkage member in the display device provided by an embodiment of the application.
Figure 12:
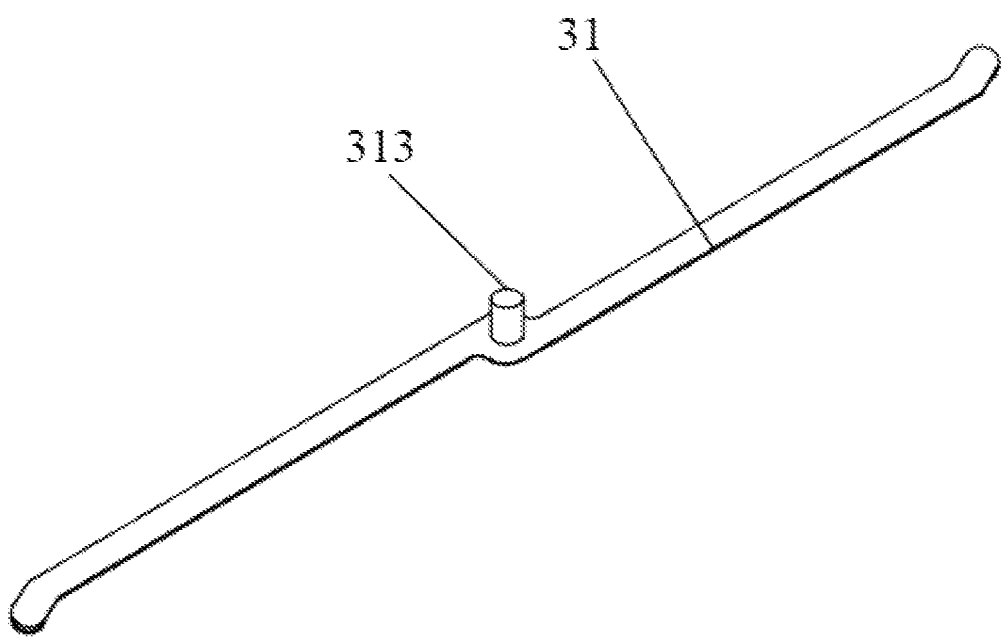
FIG. 12 is a schematic structural diagram of the first linkage member in the display device provided by an embodiment of the application.
Figure 13:
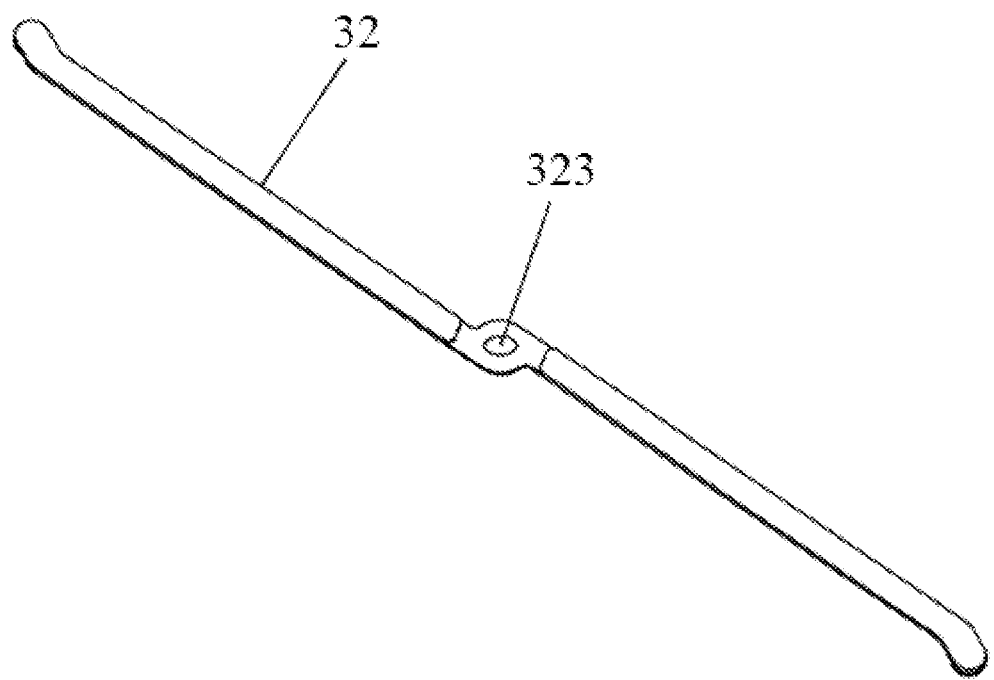
FIG. 13 is a schematic structural diagram of the second linkage member in the display device provided by an embodiment of the application.

Please refer to FIG. 11, FIG. 12 and FIG. 13, a rotating shaft 313 is provided to the first linkage member 31 where is connected to the second linkage member 32, and a rotating hole 323 is provided to the second linkage member 32 where is connected to the first linkage member 31 for accommodating the rotating shaft 313, thus the first linkage member 31 and the second linkage member 32 can be rotated.

A rotating joint of the first linkage member 31 and the second linkage member 32 is set as a. In the embodiment of the present application, a distance from the first end to the position a, a distance from the second end to the position a, a distance from the third end to the position a and a distance from the fourth end to the position a are all equal. Thus, both ends of the first linkage member 31 and both ends of the second linkage member 32 slide synchronously, and the two ends of the first linkage member 31 slide synchronously with the first support frame 11 and the second support frame 12, and the two ends of the second linkage member 32 slide synchronously with the first support frame 11 and the second support frame 12. Therefore, when the first support frame 11 and the second support frame 12 are switched between the first state and the second state, the forces on both sides are uniform, which improves the stability of the display device during the state switching process and prevents the flexible screen 20 from being damaged due to uneven force during the stretching or furling process.

In addition, the embodiment of the present application further provides a mobile terminal, comprising the display device and the terminal body described in the foregoing embodiment, and the terminal body and the display device are combined into one body.

In the foregoing embodiments, the description of the various embodiments have respective different emphases, and a part in some embodiment, which is not described in detail can be referred to the related description of other embodiments.

The display device and the mobile terminal provided by the embodiments of the present application is described in detail as aforementioned, and the principles and implementations of the present application have been described with reference to specific illustrations. The description of the foregoing embodiments is merely for helping to understand the technical solutions of the present application and the core ideas thereof; those skilled in the art should understand that the technical solutions described in the foregoing embodiments may be modified, or some of the technical features may be equivalently replaced; and the modifications or replacements do not deviate from the spirit and scope of the technical solutions of the embodiments of the present application.

What is claimed is:

1. A display device, comprising:
   a housing comprising a first support frame and a second support frame that are slidably connected in a first direction;
   a flexible screen at least partially unfurled on the first support frame and the second support frame, and comprising one end connected to the first support frame and another end connected to the second support frame;
   a linkage assembly comprising one end slidably connected to the first support frame in a second direction and another end slidably connected to the second support frame in the second direction, wherein the second direction intersects the first direction; and
   wherein when the first support frame and the second support frame slide in the first direction relative to each other, the one end of the linkage assembly is driven to slide relative to the first support frame along the second direction and the another end of the linkage assembly is driven to slide relative to the second support frame along the second direction, so that the display device is switched between a first state and a second state, an area of the flexible screen on the first support frame and the second support frame in the first state is greater than an area of the flexible screen on the first support frame and the second support frame in the second state, and the linkage assembly is employed to support the first support frame and the second support frame in a thickness direction of the display device when the display device is in the first state or the second state.

2. The display device according to claim 1, wherein the linkage assembly comprises a first linkage member and a second linkage member rotatably connected with each other, the first linkage member comprises a first end and a second end opposed to each other, the second linkage member comprises a third end and a fourth end opposed to each other, the first end and the third end are slidably connected to the first support frame in the second direction, and the second end and the fourth end are slidably connected to the second support frame in the second direction.

3. The display device according to claim 2, wherein one side of the first support frame away from the second support frame is provided with a first sliding groove and a third sliding groove parallel to the second direction and spaced apart, and one side of the second support frame away from the first support frame is provided with a second sliding groove and a fourth sliding groove parallel to the second direction and spaced apart; and
   wherein the first end is slidably connected to the first sliding groove, the second end is slidably connected to the second sliding groove, the third end is slidably connected to the third sliding groove, and the fourth end is slidably connected to the fourth sliding groove.

4. The display device according to claim 2, wherein a distance from the first end to a rotating joint of the first linkage member and the second linkage member, a distance from the second end to the rotating joint of the first linkage member and the second linkage member, a distance from the third end to the rotating joint of the first linkage member and the second linkage member, and a distance from the fourth end to the rotating joint of the first linkage member and the second linkage member are all equal.

5. The display device according to claim 2, wherein a rotating shaft is provided to the first linkage member where is connected to the second linkage member, and a rotating hole is provided to the second linkage member where is connected to the first linkage member for accommodating the rotating shaft.

6. The display device according to claim 1, wherein one side of the first support frame close to the second support frame is provided with a plurality of first support plates, one side of the second support frame close to the first support frame is provided with a plurality of second support plates, and the plurality of first support plates and the plurality of second support plates are slidably connected in the first direction.

7. The display device according to claim 6, wherein the plurality of first support plates and the plurality of second support plates are arranged alternately, a lateral side of each of the plurality of first support plates connected to an adjacent one of the plurality of second support plates is provided with a slideway, and a lateral side of the adjacent one of the plurality of second support plates is provided with a sliding block, and the sliding block is slidably connected to the slideway.

8. The display device according to claim 1, wherein a first lock is provided on the first support frame, a second lock cooperating with the first lock is provided on the second support frame, the first lock is remote from the second lock in the first state, and the first lock and the second lock are detachably connected in the second state.

9. The display device according to claim 8, wherein the first lock is a plug pin, and the second lock is a socket matched with the plug pin.

10. A mobile terminal, comprising a display device and a terminal body combined into one body, wherein the display device comprises:
    a housing comprising a first support frame and a second support frame that are slidably connected in a first direction;
    a flexible screen at least partially unfurled on the first support frame and the second support frame, and comprising one end connected to the first support frame and another end connected to the second support frame;
    a linkage assembly comprising one end slidably connected to the first support frame in a second direction and another end slidably connected to the second support frame in the second direction, wherein the second direction intersects the first direction; and
    wherein when the first support frame and the second support frame slide in the first direction relative to each other, the one end of the linkage assembly is driven to slide relative to the first support frame along the second direction and the another end of the linkage assembly is driven to slide relative to the second support frame along the second direction, so that the display device is switched between a first state and a second state, an area of the flexible screen on the first support frame and the second support frame in the first state is greater than an area of the flexible screen on the first support frame and the second support frame in the second state, and the linkage assembly is employed to support the first support frame and the second support frame in a thickness direction of the display device when the display device is in the first state or the second state.

11. The mobile terminal according to claim 10, wherein the linkage assembly comprises a first linkage member and a second linkage member rotatably connected with each other, the first linkage member comprises a first end and a second end opposed to each other, the second linkage member comprises a third end and a fourth end opposed to each other, the first end and the third end are slidably connected to the first support frame in the second direction, and the second end and the fourth end are slidably connected to the second support frame in the second direction.

12. The mobile terminal according to claim 11, wherein one side of the first support frame away from the second support frame is provided with a first sliding groove and a third sliding groove parallel to the second direction and spaced apart, and one side of the second support frame away from the first support frame is provided with a second sliding groove and a fourth sliding groove parallel to the second direction and spaced apart; and
wherein the first end is slidably connected to the first sliding groove, the second end is slidably connected to the second sliding groove, the third end is slidably connected to the third sliding groove, and the fourth end is slidably connected to the fourth sliding groove.

13. The mobile terminal according to claim 11, wherein a distance from the first end to a rotating joint of the first linkage member and the second linkage member, a distance from the second end to the rotating joint of the first linkage member and the second linkage member, a distance from the third end to the rotating joint of the first linkage member and the second linkage member, and a distance from the fourth end to the rotating joint of the first linkage member and the second linkage member are all equal.

14. The mobile terminal according to claim 11, wherein a rotating shaft is provided to the first linkage member where is connected to the second linkage member, and a rotating hole is provided to the second linkage member where is connected to the first linkage member for accommodating the rotating shaft.

15. The mobile terminal according to claim 10, wherein one side of the first support frame close to the second support frame is provided with a plurality of first support plates, one side of the second support frame close to the first support frame is provided with a plurality of second support plates, and the plurality of first support plates and the plurality of second support plates are slidably connected in the first direction.

16. The mobile terminal according to claim 15, wherein the plurality of first support plates and the plurality of second support plates are arranged alternately, a lateral side of each of the plurality of first support plates connected to an adjacent one of the plurality of second support plates is provided with a slideway, and a lateral side of the adjacent one of the plurality of second support plates is provided with a sliding block, and the sliding block is slidably connected to the slideway.

17. The mobile terminal according to claim 10, wherein a first lock is provided on the first support frame, a second lock cooperating with the first lock is provided on the second support frame, the first lock is remote from the second lock in the first state, and the first lock and the second lock are detachably connected in the second state.

18. The mobile terminal according to claim 17, wherein the first lock is a plug pin, and the second lock is a socket matched with the plug pin.

* * * * *